United States Patent Office 2,945,853
Patented July 19, 1960

2,945,853
BACTERIOSTATIC COMPOUNDS AND PROCESSES FOR THEIR PREPARATION

Remsen Ten Eyck Schenck, Bangor, Pa., assignor to Keystone Chemurgic Corporation, Bethlehem, Pa., a corporation of Pennsylvania No Drawing. Filed Sept. 18, 1958, Ser. No. 761,692

14 Claims. (Cl. 260—239.65)

This invention relates to imido sulfonic esters and to processes for their preparation, and particularly to water-soluble sulfonimidoesters of γ-sulfopropanol, δ-sulfobutanol and o-sulfobenzyl alcohol, and the like.

Sulfanilamide, p-aminobenzenesulfonamide, and certain of its derivatives in which one of the hydrogen atoms of the amide nitrogen has been replaced by a group such as thiazolyl, pyridyl, pyrimidyl, guanidyl or the like, have been known for the last two decades to be powerful bacteriostatic agents. They do not actually kill bacteria to an appreciable extent, but in their presence the microorganisms are unable to multiply, and are thus readily brought under control by other means, as by the various normal defense mechanisms of the body. In achieving this effect, the sulfonamides are believed to act as antimetabolites: their structure is fundamentally similar to that of an amino acid, and the bacteria apparently attempt to utilize the sulfonamide molecule in the synthesis of the protein chains which are requisite to the growth which precedes cellular division. Such a synthesis cannot be successful, however; the free amino group enters easily into combination, but the group at the other end of the sulfonamide molecule is unreactive and will not continue the condensation. The process of chain-building is thus terminated before the necessary protein is complete, and growth is halted.

This type of sulfonamide constitutes an important weapon against infection. It is used locally, in both accidental and surgical wounds, with such success that the incidence of serious local infections, such as peritonitis, is now only a small fraction of that experienced previously. To an even greater extent it is given internally to combat systemic infections ranging from pyemia to pneumonia. Nearly every pathogenic bacterium can be controlled more or less successfully by one or another of the pharmacologic sulfonamides.

One of the major limitations of sulfonamide therapy has been the relative insolubility of the drugs. It was found at an early stage that effective treatment required that the concentration of the active material in the body fluids be quickly brought to a relatively high level and be held there until the desired results were obtained. This is reasonable, if only on the basis of the mass-action principle: the bacteria must utilize the sulfonamide for their growth to be inhibited, and they will be the more apt to utilize it in place of the normal amino acids if its concentration is high compared to that of the amino acids. Obtaining a high blood level of a difficultly-soluble drug by absorption from the digestive tract, however, is not readily accomplished. It is generally recognized that if the solubility of sulfonamides of accepted value in the body fluids could be increased without impairing their bacteriostatic activity, many problems of treatment would be solved and the efficacy of the therapy would be generally improved.

Many attempts have been made to achieve such an increased solubility, heretofore without complete success. Any sulfonamide is more soluble in either acidic or basic solutions than it is at a pH near neutrality, and this fact is put to use. Both acidic salts, such as the hydrochloride, and basic salts, such as the sodium compound, have been and are utilized. The latter is particularly common, as it is in this form that sulfonamides are administered by injection, when for any reason the oral route is not applicable. While the difficulties are in this manner somewhat lessened, they are by no means removed. The body does not tolerate appreciable departures in pH from its normal state, and acts swiftly to correct such changes. Acidic or basic sulfonamide solutions are rapidly neutralized by the buffer action of the bile when taken orally and of the blood when injected, and the solubility of the active material is soon reduced to the level characteristic of essentially neutral solutions. Furthermore, care must be taken when injecting the sodium salt of a sulfonamide not to overestimate the buffering capacity of the blood, as such basic solutions can be very destructive to tissue if not promptly neutralized. This method thus succeeds in rapidly introducing the sulfonamide into the blood, but does not provide a higher equilibrium level.

Another mode of attack has been to introduce into the sulfonamide molecule a solubilizing group such as sulfonate or carboxylate. These groups have been attached to the benzene ring or to the free amino nitrogen (cf. Fish, Stevens and Moore, J.A.C.S., 69, 1391 (1947)). In either case the result has been to destroy the bacteriostatic activity of the drug. If the free amino group is in any way altered the ability of the molecule to enter into protein synthesis is lost, while attachment of a solubilizing group to the benzene nucleus also negates the anti-metabolic qualities, perhaps by interfering with the chain-terminating mechanism.

I have now discovered that water solubility at a pH near neutrality can be conferred upon a sulfonamide molecule by attachment of a short aliphatic chain bearing a sulfonic acid group to the sulfonamide substituent through oxygen to the sulfonate sulphur atom thereof. The resulting compound is thus an imido sulfonic ester. Since the sulfonamide grouping does not enter into the reactions involved in the antimetabolic action of the sulfonamide, no loss of bacteriostatic activity results from this modification. The compounds thus produced are very soluble in water, as their sodium or potassium salts, easily forming solutions containing 50% by weight of solute. These solutions are practically neutral, having a pH typically between 7 and 8. The solubility is furthermore independent of pH changes; no precipitation can be caused by addition of either acid or base to the solution. In both bacteriostatic activity and toxicity such a solubilized material is closely comparable to the parent sulfonamide. These substances are therefore very useful pharmaceutically, as they permit of attaining higher levels of the drug in the blood more rapidly. Being neutral, they may be injected without danger of precipitation or of necrosis from excessive acidity or alkalinity.

In accordance with the present invention, the solubilizing moiety is introduced into a sulfonamide molecule and is attached through oxygen to the sulfonate sulphur atom by heating its sodium or potassium salt with a sultone. Sultones are cyclic compounds, having 5- or 6-membered rings produced by the internal esterification of an appropriately-oriented hydroxy sulfonic acid. In a chemical sense, any sultone may be used; there are limitations pharmacologically, however, as for these purposes the grouping introduced by the sultone must not increase the toxicity of the final compound over that of the parent sulfonamide. Propane sultone (the sultone of 3-hydroxy-propane sulfonic acid), butane sultone (the sultone of 4-hydroxy-butane sulfonic acid) and benzoyl-o-sultone (the sultone of o-sulfobenzyl alcohol) have been found to be suitable. Any sulfonamide which will form a sodium or potassium salt, which is to say any which possesses a replaceable hydrogen atom upon the amide nitrogen, will perform in this reaction. This embraces all the sulfonamides now known to be pharmacologically active.

The imido sulfonic esters of the present invention are prepared by heating the alkali metal salt of a sulfonamide with a sultone in mole for mole amounts in an anhydrous, ionizing, and nonsolvolytic solvent, preferably dimethyl formamide. The important characteristics of the solvent used in the processes according to this invention are that it be anhydrous, that the sulfonamide salt dissociate electrolytically when dissolved therein, and that it be nonsolvolytic, that is, that it contain no acidic hydrogen atom so that a protolytic reaction with the dissolved solute is impossible. I have found dimethyl formamide to have all of the aforementioned solvent characteristics and to be well adapted to the practice of this invention.

The products of this reaction are so highly soluble in aqueous solvents as to be uncrystallizable. It is therefore necessary always to take the reactants in equimolar proportions, since it would be difficult if not impossible to separate the desired product from an excess of either reactant. This is no hardship, however, as the reaction goes easily to completion and no excesses are needed.

I have observed that when the products of the processes described herein are hydrolyzed, the result is the original sulfonamide and the hydroxy alkyl sulfonate which results from hydrolysis of the particular sultone used in the process. This can occur only if the carbon atom of the solubilizing moiety is not bonded to the nitrogen of the sulfonamide. This is true since it would not be possible to break a methylene-to-nitrogen bond under such hydrolysis conditions. The only possible alternative is that the carbon atom of the solubilizing moiety is attached through oxygen to the sulphur atom of the sulfonamide. Therefore the products of the present invention are imido sulfonic esters, since the ester of a sulfonamide is the only structure in accord with the evidence. The reaction between the salt of the sulfonamide and the sultone in the process of the present invention is as follows:

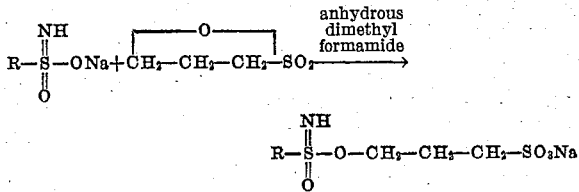

The hydrolysis reaction of the imido sulfonic ester thus obtained is represented by the following:

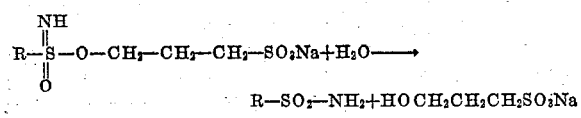

Where aryl sulfonamides are used, the representation of the imido sulfonic esters obtained correspond to the following representation:

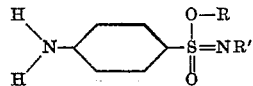

A wide variety of substances of this type have been tested for biological activity against a group of representative organisms grown on meat extract agar or blood agar. The results, using the cup plate technique, are listed in the following table. It is apparent from these figures that the solubilized derivatives are generally comparable in the bacteriostatic potency with the corresponding parent sulfonamides. On the average any difference is in fact in favor of the soluble form.

*Diameter of zone of inhibitions, mm.*

| Microorganism | Sulfathiazole | | Sulfapyridine | | Sulfamerazine | | Sulfathiadiazole | |
|---|---|---|---|---|---|---|---|---|
| | Plain | Soluble | Plain | Soluble | Plain | Soluble | Plain | Soluble |
| S. Aureus | 30 | 34 | 25 | 24 | 36 | 32 | 26 | 29 |
| St. Hemolyticus | 18 | 23 | 15 | 17 | 22 | 23 | 14 | 18 |
| E. Coli | 26 | 33 | 20 | 20 | 20 | 24 | 22 | 22 |
| A. Aerogenes | 15 | 19 | 14 | 19 | 18 | 16 | 12 | 4 |
| Pneumococcus | 22 | 25 | 22 | 19 | 30 | 32 | 26 | 29 |

Solubilized sulfonamides prepared by the process herein described have been tested for toxicity in experimental animals. A typical example involved the determination of the $LD_{50}$ in mice of the reaction product of sulfathiazole and propane sultone. When administered intragastrically in a single dose, this was found to be 10 gm. per kg. of body weight. Since the $LD_{50}$ for sulfathiazole itself under similar conditions is 8.2 gm. per kg. of body weight, it is seen that the solubilized material is only about 80% as toxic as the parent sulfonamide, gram for gram. About 70% by weight of the solubilized substance is accounted for by the sulfathiazole it contains; it may thus be said in general that the toxicity of the product corresponds to its sulfonamide content, the added solubilizing group contributing no measurable toxicity.

It has further been established by animal experimentation that these soluble compounds are effectively absorbed into the bloodstream when given by mouth. In one such test, rabbits were given solubilized sulfanilamide by mouth at the rate of 65 mg. per kg. of body weight. The urine was then tested periodically for the presence of sulfonamides. The test became positive within three hours, reached a maximum after 8 hours, and became negative again after 15 hours. These intervals are slightly shorter than those observed on administration of sulfanilamide itself.

*Example 1.*—Two-tenths mole (55.4 gm.) of the anhydrous sodium salt of sulfathiazole was dissolved in 500 cc. of anhydrous dimethyl formamide in a one-liter round-bottom flask. Two-tenths mole (24.4 gm.) of propane sultone was added, and the mixture was stirred until solution was complete. The flask was then heated on the steam bath for one-half hour, with stirring, whereupon as much of the solvent as possible was removed by vacuum distillation. The glassy residue dissolved completely in 100 cc. of warm water to form a clear yellowish solution with a pH of about 7.5 No precipitate formed in this solution on addition of either caustic alkali or strong mineral acid. An aqueous solution of the starting materials, in contrast, has a pH of 10.5 and gives a heavy precipitate on neutralization. The solid product was recovered by evaporating the solvent, either by lyophilization or more conveniently by spray drying. There was thus obtained about 80 gm. of a yellowish, impalpable, hygroscopic powder which is the sodium salt of the $N^1$-

(2-thiazolyl)-p-aminobenzenesulfonimidoester of 3-sulfopropanol. Ultimate analysis gave the following results:

|   | Calc. for $C_{12}H_{14}O_5N_3S_3Na$ | Found |
| --- | --- | --- |
|   | Percent | Percent |
| C | 36.1 | 35.8 |
| H | 3.51 | 3.65 |
| N | 10.53 | 9.94 |
| S | 24.07 | 24.20 |
| Na | 5.76 | 5.23 |

*Example 2.*—Two-tenths mole (57.8 gm.) of the monohydrated sodium salt of sulfapyridine was dissolved in one liter of anhydrous dimethyl formamide in a 2-liter round bottom flask. Two-tenths mole (24.4 gm.) of propane sultone was added, and the mixture was stirred until solution was complete. The solvent was then heated on the steam bath for one-half hour with stirring whereupon the solvent was removed as much as possible by vacuum distillation. The glassy white insoluble residue was completely soluble in 100 cc. of warm water to give a clear, almost colorless solution with a pH of about 7.5. This solution remained clear on addition of either caustic alkali or strong mineral acid. In contrast, an aqueous solution of the starting materials has a pH of 10.5 and gives a heavy precipitate on neutralization. The solid product was isolated by evaporating the solvent, either by lyophilization or more conveniently by spray drying. There was thus obtained about 74 gm. of an impalpable, hygroscopic white powder which is the sodium salt of the $N^1$-(2-pyridyl)-p-aminobenzenesulfonimidoester of 3-sulfopropanol. The elementary composition as determined by ultimate analysis is:

|   | Calc. for $C_{14}H_{16}O_5N_3S_2Na$ | Found |
| --- | --- | --- |
|   | Percent | Percent |
| C | 42.73 | 42.80 |
| H | 4.07 | 4.50 |
| N | 10.68 | 10.96 |
| S | 16.29 | 15.75 |
| Na | 5.85 | 5.67 |

*Example 3.*—Two-tenths mole (57.2 gm.) of the sodium salt of sulfamerazine was suspended in 300 cc. of dimethyl formamide in a one-liter round-bottom flask. Two-tenths mole (24.4 gm.) of propane sultone was added, and the mixture was heated on the steam bath with stirring. When the internal temperature reached the neighborhood of 60°–70° C. the sodium salt went into solution, indicating that a reaction had occurred. The clear solution was further heated for about one-half hour to insure that reaction was complete, and the solvent was then removed as completely as possible by vacuum distillation. The residual glassy yellow solid was completely soluble in 100 cc. of warm water to yield a clear yellow solution with a pH of about 7.5. No precipitate was produced in this solution by the addition of either hydrochloric acid or sodium hydroxide. In contrast, an aqueous solution of the starting materials has a pH of about 10.5, and gives a heavy precipitate on neutralization. The pure product was recovered by evaporating the solvent, either by lyophilization or more conveniently by spray drying. There was thus obtained about 80 gm. of an impalpable, hygroscopic yellow powder which is the sodium salt of the $N^1$-(2-(4-methylpyrimidyl))-p-aminobenzenesulfonimidoester of 3-sulfopropanol. Ultimate analysis gave the following results:

|   | Calc. for $C_{14}H_{17}O_5N_4S_2Na$ | Found |
| --- | --- | --- |
|   | Percent | Percent |
| C | 41.15 | 41.10 |
| H | 4.17 | 4.52 |
| N | 13.73 | 13.60 |
| S | 15.7 | 15.27 |
| Na | 5.64 | 5.53 |

*Example 4.*—Two-tenths mole (61 gm.) of the sodium salt of 2-sulfanilamido-5-ethyl-1,3,4-thiadiazole was dissolved in 500 cc. of anhydrous dimethyl formamide in a one-liter round-bottom flask. Two-tenths mole (24.4 gm.) of propane sultone was added, and the mixture was stirred until solution was complete. The flask was then heated on the steam bath for one-half hour, with stirring, whereupon as much of the dimethyl formamide as possible was removed by vacuum distillation. The glassy residue dissolved completely in 100 cc. of warm water to form a clear yellowish solution with a pH of about 7.5. No precipitate formed in this solution on addition of either caustic alkali or strong mineral acid. An aqueous solution of the starting materials, in contrast, has a pH of 10.5 and gives a heavy precipitate on neutralization. The solid product was recovered by evaporating the solvent, either by lyophilization or more conveniently by spray drying. There was thus obtained 85 gm. of an impalpable, hygroscopic yellow powder which is the sodium salt of the $N'$-(2-(5-ethyl-1,3,4-thiadiazolyl))-p-aminobenzenesulfonimidoester of 3-sulfopropanol. Ultimate analysis gave the following results:

|   | Calc. for $C_{13}H_{17}O_5N_4S_3Na$ | Found |
| --- | --- | --- |
|   | Percent | Percent |
| C | 36.45 | 36.60 |
| H | 3.97 | 4.22 |
| N | 13.09 | 13.01 |
| S | 22.43 | 22.45 |
| Na | 5.37 | 5.06 |

*Example 5.*—The process of Example 1 using two-tenths mole (27.2 gm.) of butane sultone in place of the propane sultone of Example 1. There was thus obtained about 83 gm. of a yellowish, impalpable, hygroscopic powder which is the sodium salt of the $N^1$-(2-thiazolyl)-p-aminobenzenesulfonimidoester of 4-sulfobutanol.

*Example 6.*—The process of Example 2 using two-tenths mole (27.2 gm.) of butane sultone in place of the propane sultone of Example 2. There was thus obtained about 77 gm. of an impalpable, hygroscopic white powder which is the sodium salt of the $N^1$-(2-pyridyl)-p-aminobenzenesulfonimidoester of 4-sulfobutanol.

*Example 7.*—The process of Example 3 using two-tenths mole (27.2 gm.) of butane sultone in place of the propane sultone of Example 3. There was thus obtained about 83 gm. of an impalpable, hygroscopic yellow powder which is the sodium salt of the $N^1$(2-(4-methylpyrimidyl))-p-aminobenzenesulfonimidoester of 4-sulfobutanol.

*Example 8.*—The process of Example 4 using two-tenths mole (27.2 gm.) of butane sultone in place of the propane sultone of Example 4. There was thus obtained about 88 gm. of an impalpable, hygroscopic yellow powder which is the sodium salt of the $N^1$-(2-(5-ethyl-1,3,4-thiadiazolyl))-p-aminobenzenesulfonimidoester of 4-sulfobutanol.

*Example 9.*—The process of Example 1 using two-tenths mole (34.2 gm.) of benxyl-o-sultone in place of the propane sultone of Example 1. There was thus obtained about 90 gms. of a yellowish, impalpable, hygroscopic powder which is the sodium salt of the $N^1$-(2-thiazolyl)-p-aminobenzenesulfonimidoester of o-sulfobenzyl alcohol.

*Example 10.*—The process of Example 2 using two-tenths mole (34.2 gm.) of benzyl-o-sultone in place of the propane sultone of Example 2. There was thus obtained about 84 gm. of an impalpable, hygroscopic white powder which is the sodium salt of the $N^1$-(2-pyridyl)-p-aminobenzenesulfonimidoester of o-sulfobenzyl alcohol.

*Example 11.*—The process of Example 3 using two-tenths mole (34.2 gm.) of benzyl-o-sultone in place of the propane sultone of Example 3. There was thus obtained about 90 gm. of an impalpable, hygroscopic yellow powder which is the sodium salt of the $N^1$-(2-(4-methylpyrimidyl))-p-aminobenzenesulfonimidoester of o-sulfobenzyl alcohol.

Example 12.—The process of Example 4 using two-tenths mole (34.2 gm.) of benzyl-o-sultone in place of the propane sultone of Example 4. There was thus obtained about 95 gm. of an impalpable, hygroscopic yellow powder which is the sodium salt of the N'-(2-(5-ethyl-1,3,4-thiadiazolyl))-p-aminobenzenesulfonimidoester of o-sulfobenzyl alcohol.

While I have described the present invention in terms of preferred examples, it will be understood that various modifications and supplemental steps may be employed in carrying out the process as defined in the appended claims. For instance, the reaction is not confined to the four sulfonamides cited in the examples; it may similarly be applied to any bacteriostatically-active sulfonamide which retains at least one replaceable hydrogen atom on the amide nitrogen. Furthermore, other non-solvolytic ionizing liquids, such as dimethyl acetamide or liquid sulphur dioxide, may be used in place of dimethyl formamide as a reaction medium.

While I have described the present invention in terms of the sodium and potassium salts in the specific examples, I may use the other alkali metals such as lithium, rubidium and cesium in the practice of the invention.

This application is a continuation-in-part of copending application Serial No. 661,286, filed May 24, 1957, now abandoned.

I claim:

1. Water-soluble essentially neutral compounds having bacteriostatic properties, consisting of the alkali metal salts of substances characterized by the formula

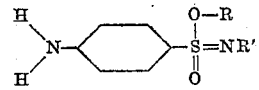

where R is selected from the group consisting of γ-sulfopropyl, δ-sulfobutyl, and o-sulfobenzyl, and R' is selected from the group consisting of 2-pyridyl, 2-thiazolyl, 4-methyl-2-pyrimidyl, and 2-(5-ethyl-1,3,4-thiadiazolyl).

2. As new compositions of matter, the alkali metal salts of the $N^1$-(2-pyridyl)-p-aminobenzenesulfonimidoesters of sulfoalkanols having from 3 to 4 carbon atoms.

3. As a new composition of matter, an alkali metal salt of the $N^1$-(2-pyridyl)-p-aminobenzenesulfonimidoester of o-sulfobenzyl alcohol.

4. As new compositions of matter, the alkali metal salts of the $N^1$-(2-(4-methylpyrimidyl))-p-aminobenzenesulfonimidoesters of sulfoalkanols having from 3 to 4 carbon atoms.

5. As a new composition of matter, an alkali metal salt of the $N^1$-(2-(4-methylpyrimidyl))-p-aminobenzenesulfonimidoesters of o-sulfobenzyl alcohol.

6. As new compositions of matter, the alkali metal salts of the $N^1$-(2-thiazolyl)-p-aminobenzenesulfonimidoesters of sulfoalkanols having from 3 to 4 carbon atoms.

7. As a new composition of matter, an alkali metal salt of the $N^1$-(2-thiazolyl)-p-aminobenzenesulfonimidoester of o-sulfobenzyl alcohol.

8. As new compositions of matter, the alkali metal salts of the $N^1$-(2-(5-ethyl-1,3,4-thiadiazolyl))-p-aminobenzenesulfonimidoesters of sulfoalkanols having from 3 to 4 carbon atoms.

9. As a new composition of matter, an alkali metal salt of the $N^1$-(2-(5-ethyl-1,3,4-thiadiazolyl))-p-aminobenzenesulfonimidoester of o-sulfobenzyl alcohol.

10. The process of producing a water-soluble, neutral bacteriostatically active p-amino benzenesulfonimidoester comprising heating to a temperature of at least 60° C. the alkali metal salt of a p-amino benzenesulfonamide with a sultone selected from the group consisting of propane sultone, butane sultone and benzyl-o-sultone in mole for mole amounts in an anhydrous, ionizing and non-solvolytic organic solvent selected from the group consisting of dimethyl formamide, dimethyl acetamide and liquid sulfur dioxide.

11. The process of claim 10 further characterized by the fact that the sultone is propane sultone.

12. The process of claim 10 further characterized by the fact that the sultone is butane sultone.

13. The process of claim 10 further characterized by the fact that the sultone is benzyl-o-sultone.

14. The process of claim 10 further characterized by the fact that the solvent is dimethyl formamide.

References Cited in the file of this patent

FOREIGN PATENTS

| 473,694 | Canada | May 15, 1951 |
| 907,892 | Germany | Mar. 29, 1954 |
| 500,118 | Great Britain | Jan. 30, 1939 |

OTHER REFERENCES

Northey: The Sulfonamides and Allied Compounds, ACS Monograph Series No. 106, Reinhold Publishing Corporation (1948), pp. 56–57.